Dec. 31, 1935.    W. R. FREEMAN    2,025,854
POWER OPERATED CLUTCH
Filed March 9, 1932
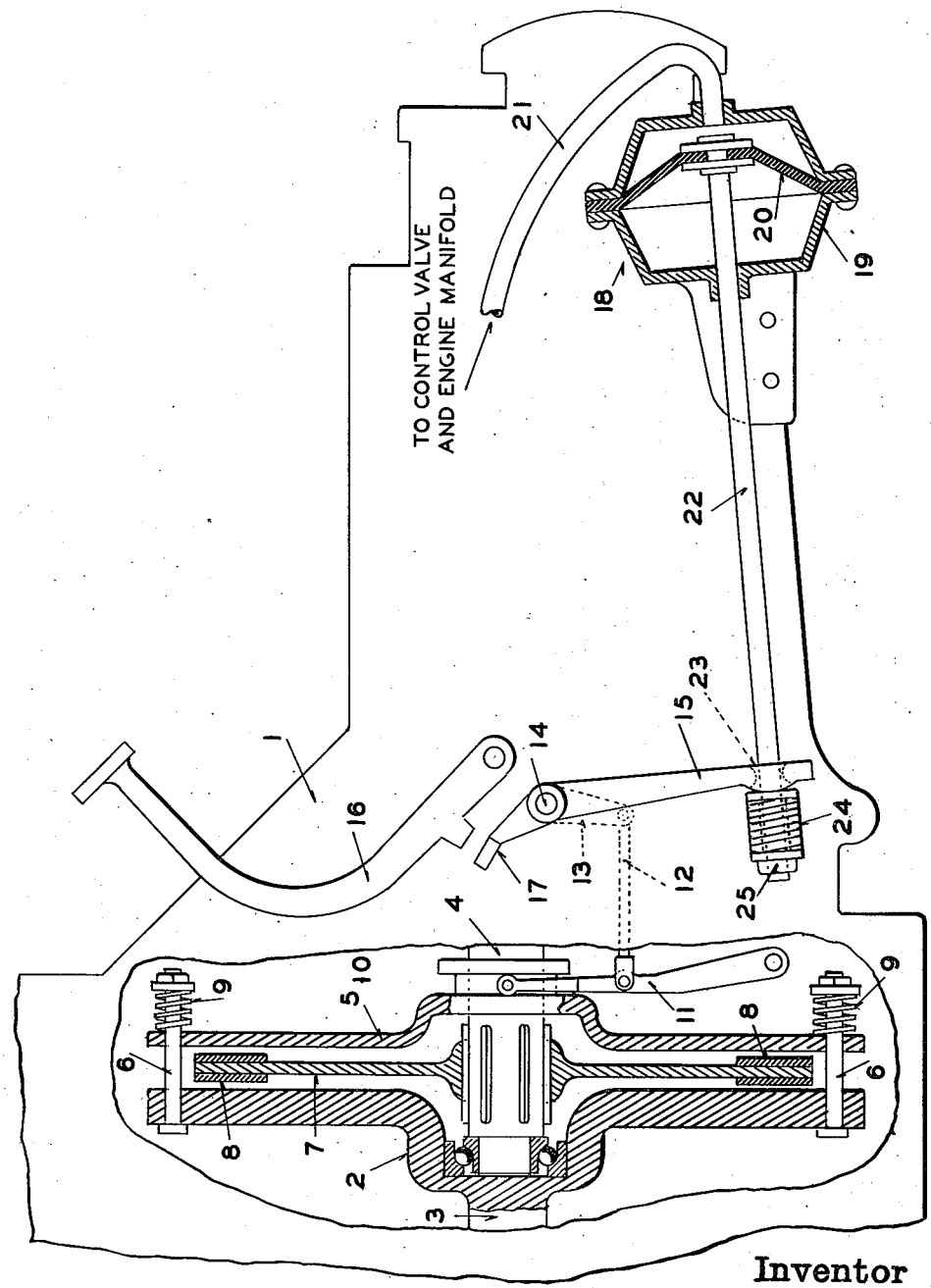
Inventor
W. R. FREEMAN
By [signature]
Att'y.

Patented Dec. 31, 1935

2,025,854

UNITED STATES PATENT OFFICE 2,025,854

POWER-OPERATED CLUTCH

Walter R. Freeman, Jay, Okla., assignor to Bragg-Kliesrath Corporation, South Bend, Ind., a corporation of New York Application March 9, 1932, Serial No. 597,675

1 Claim. (Cl. 192—91)

My invention relates to clutches for motor vehicles and especially to clutches which are actuated by power means such as a suction motor or fluid pressure motor.

Power operated means for disengaging clutches and for controlling their reengagement, operate satisfactorily when the facings on the clutch elements are new but when they become hard and polished from wear, I have discovered that the clutch engaging spring or springs exert their full pressure on the clutch plates after a very slight movement of the clutch collar from the position in which the plates are just touching. Under these conditions the power means cannot let the clutch engage with the desirable slight slipping action, as is possible when the clutch is manually operated by the foot of a driver and, therefore, the clutch will "grab" and jerk the vehicle as it is started.

The principal object of my invention is to provide means between the clutch collar and the power actuating means which will permit the clutch springs to only progressively increase the pressure between the clutch plates after they have assumed the position in which they are just touching, the means in no way diminishing the final pressure exerted by the clutch springs.

Other objects will become apparent from the following description of an embodiment of my invention taken in connection with the accompanying drawing in which the figure is a side elevation, partly in section, showing a power-operated clutch embodying my invention, the clutch being in disengaged position.

Although I have shown my invention applied to a suction motor actuated disc clutch, it is to be understood that it may be equally well applied to other types of clutches and power-actuating means. It is also to be understood that the means for controlling the engagement of the clutch may be placed at other points in the connection between the clutch and power actuator than the one shown.

Referring to the drawing, 1 indicates the outline of a clutch and transmission housing for a motor vehicle. The clutch comprises a plate 2 secured to the engine shaft 3 into which the transmission shaft 4 is piloted for relative rotation. A second plate 5 is slidably and rotatably mounted on the shaft 4 and connected for rotation with, and movement toward and away from the plate 2 by means of pins 6 carried by plate 2, two only being shown. A disc 7 is interposed between the plates 2 and 5 and splined to the shaft 4, this disc being provided with the facings 8 for frictional engagement with the plates, the plate 5 of which is biased toward the plate 2 by relatively strong clutch springs 9 surrounding the pins 6 and lying between the plate 5 and a stop fixed to the end of the pin.

The plate 5 carries a grooved collar 10 into which extends the forked end of the clutch lever 11 which is pivoted to the clutch housing. The clutch lever is connected by a rod 12 with a short arm 13 secured to a cross shaft 14, the external end of the cross shaft being provided with a lever 15 for actuating the arm 13. The usual clutch pedal 16 is pivoted to the transmission housing and is adapted to engage an extension 17 on the lever 15 for manual actuation of the clutch when such is desired.

The suction motor 18, which is shown as the power means for actuating the clutch, is supported by the rear of the transmission housing and comprises a casing 19 and a flexible diaphragm 20 of well known construction. The housing 19 on one side of the diaphragm is in communication with the manifold of the engine by means of a conduit 21 and is controlled by a suitable valve (not shown). A rod 22 for actuating the lever 15 is secured to the diaphragm and extends out of the housing on the opposite side of the diaphragm from the conduit 21.

In accordance with my invention, I extend the rod 22 through an over-size opening 23 in the lower end of the lever 15 and provide the end of the rod 22 with a coil spring 24 interposed between a nut 25 on the end of the rod and the lever 15. Suitable washers 26 are placed at each end of the spring to form smooth abutment surfaces. The strength of spring 24, in its compressed condition, is somewhat less than the combined strength of the clutch springs 9, thus allowing the rod 22, when moved to the right to disengage the clutch, to fully compress spring 24 before disengaging the clutch against the action of clutch springs 9.

In operation, the clutch is disengaged by placing the suction motor in communication with a manifold, thus drawing the diaphragm 20 to the right, compressing spring 24, and then actuating clutch lever 11 to move plate 5 away from disc 7 and against the action of clutch springs 9. The position of the suction motor and the connections to the clutch in the disengaged position of the clutch, are shown in the drawing.

When the clutch is to be engaged, the control valve vents the suction motor to atmosphere, allowing the diaphragm 20 and the rod 22 to be moved to the left with a "dash-pot" action, the degree of retardation of this motion being governed by the valve opening. The spring 24 remains compressed until the plates 2 and 5 come into contact with the faces of the disc 7. The pressure exerted upon the disc by the plates, assuming the faces of the disc to be non-compressible, will be the difference between that exerted by the clutch springs 9 and the spring 24, since the weaker spring 24 is acting against the springs 9. As the rod 22 continues to move to the left, spring 24 begins to expand, thereby progressively decreasing the pressure it is exerting in opposition to the clutch springs and thus allowing the clutch springs to progressively exert a greater pressure on the disc 7 to gradually engage the clutch, instead of suddenly. When the spring 24 is completely expanded, the clutch springs will be exerting their maximum pressure to maintain the clutch engaged. It is thus seen that the engagement of the clutch is "smoothed out" and the possibility of the clutch plates grabbing the disc, is eliminated. Also, the maximum pressure of the clutch springs to hold the clutch engaged after the engaging operation has been performed, is in no way diminished.

Having fully described my invention, what I claim as new and desire to secure by Letters Patent of the United States is:

In a motor vehicle, clutch operating means including a lever member, a manually operable pedal adapted to contact one end of said lever member by a lost motion connection to thereby effect a manual operation of the clutch, a pressure differential operated motor comprising a cylinder member and a power element reciprocable within said cylinder member, and means interconnecting said power element and lever member comprising a link sleeved through an opening in the other end of said lever member, and a spring, weaker than the clutch springs, interposed between said end and one end of said link and serving as a force transmitting means in the connection between the lever and the power element to facilitate the engagement of the clutch.

WALTER R. FREEMAN.

CERTIFICATE OF CORRECTION.

Patent No. 2,025,854.                                                December 31, 1935.

WALTER R. FREEMAN.

It is hereby certified that error appears in the printed specification of the above numbered patent requiring correction as follows: Page 2, second column, line 18, in the claim, after the word "said" first occurrence, insert lever; and that the said Letters Patent should be read with this correction therein that the same may conform to the record of the case in the Patent Office.

Signed and sealed this 6th day of October, A. D. 1936.

Henry Van Arsdale (Seal)                                                Acting Commissioner of Patents.